US011440579B2

(12) United States Patent
Kakita et al.

(10) Patent No.: US 11,440,579 B2
(45) Date of Patent: Sep. 13, 2022

(54) STEERING COLUMN DEVICE

(71) Applicant: NSK LTD., Tokyo (JP)

(72) Inventors: Hiroshi Kakita, Maebashi (JP); Kazuki Hara, Maebashi (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 17/294,267

(22) PCT Filed: Nov. 15, 2019

(86) PCT No.: PCT/JP2019/044900
§ 371 (c)(1),
(2) Date: May 14, 2021

(87) PCT Pub. No.: WO2020/101018
PCT Pub. Date: May 22, 2020

(65) Prior Publication Data
US 2022/0001914 A1    Jan. 6, 2022

(30) Foreign Application Priority Data

Nov. 16, 2018 (JP) .............................. JP2018-215628

(51) Int. Cl.
*B62D 1/19* (2006.01)
*B62D 1/184* (2006.01)
*B62D 1/185* (2006.01)

(52) U.S. Cl.
CPC ............ *B62D 1/192* (2013.01); *B62D 1/184* (2013.01); *B62D 1/185* (2013.01)

(58) Field of Classification Search
CPC ......... B62D 1/192; B62D 1/184; B62D 1/185
See application file for complete search history.

(56) References Cited

U.S. PATENT DOCUMENTS

| 9,637,161 B2 * | 5/2017 | Orihara .................... B62D 1/19 |
| 2013/0213174 A1 * | 8/2013 | Suzuki ................... B62D 1/187 |
| | | 74/493 |

(Continued)

FOREIGN PATENT DOCUMENTS

| CN | 112930296 A * | 6/2021 | ............. B62D 1/192 |
| JP | 2016-165935 A | 9/2016 | |

(Continued)

OTHER PUBLICATIONS

International Search Report for PCT/JP2019/044900 dated Feb. 10, 2020 [PCT/ISA/210].

(Continued)

*Primary Examiner* — Drew J Brown
(74) *Attorney, Agent, or Firm* — Sughrue Mion, PLLC

(57) ABSTRACT

A steering column device has an inner column; an outer column combined with the inner column and having a slit extending in the axial direction, the inner column and the outer column configuring a telescopic steering column; a release bracket arranged inside the slit of the outer column and supported by and fixed to the inner column; a support bracket joined to the release bracket so as to be able to detach due to an impact load that is applied to the inner column during a secondary collision; and a telescopic friction plate having a function to increase a holding force for holding the steering column with respect to a vehicle-body-side bracket and supported by the support bracket.

5 Claims, 18 Drawing Sheets

(56) References Cited

U.S. PATENT DOCUMENTS

| | | | | |
|---|---|---|---|---|
| 2013/0327177 A1* | 12/2013 | Tanaka | ................ | B62D 1/185 |
| | | | | 74/493 |
| 2015/0239490 A1* | 8/2015 | Sakata | ................ | B62D 1/195 |
| | | | | 74/493 |
| 2015/0266495 A1* | 9/2015 | Yoshihara | ............ | B62D 1/195 |
| | | | | 74/493 |
| 2015/0344062 A1 | 12/2015 | Johnta et al. | | |
| 2015/0353123 A1* | 12/2015 | Jyota | ................ | B62D 1/184 |
| | | | | 74/493 |
| 2016/0264168 A1 | 9/2016 | Kubota et al. | | |
| 2019/0031225 A1 | 1/2019 | Kurokawa | | |
| 2019/0047608 A1* | 2/2019 | Ishikawa | ............ | B62D 1/184 |

FOREIGN PATENT DOCUMENTS

| | | |
|---|---|---|
| JP | 2017-154558 A | 9/2017 |
| JP | 2018-024400 A | 2/2018 |
| JP | 2019-182358 A | 10/2019 |
| WO | 2015/064392 A1 | 5/2015 |
| WO | WO-2015064345 A1 * | 5/2015 ............ B62D 1/184 |
| WO | WO-2015064392 A1 * | 5/2015 ............ B62D 1/184 |
| WO | WO-2016035515 A1 * | 3/2016 ............ B62D 1/185 |
| WO | 2017/135384 A1 | 8/2017 |
| WO | WO-2017158720 A1 * | 9/2017 ........... B60R 16/027 |
| WO | WO-2018181304 A1 * | 10/2018 ............ B62D 1/184 |

OTHER PUBLICATIONS

Written Opinion for PCT/JP2019/044900 dated Feb. 10, 2020 [PCT/ISA/237].

* cited by examiner

FIG. 1

STEERING COLUMN DEVICE

CROSS REFERENCE TO RELATED APPLICATIONS

This application is a National Stage of International Application No. PCT/JP2019/044900 filed Nov. 15, 2019, claiming priority based on Japanese Patent Application No. 2018-215628 filed Nov. 16, 2018.

TECHNICAL FIELD

The present invention relates to a steering column device for rotatably supporting a steering shaft that supports a steering wheel.

BACKGROUND ART

FIG. 16 illustrates an example of a steering device for an automobile. The rotation of a steering wheel 101 is transmitted to a steering gear unit 105 via a steering shaft 102, a universal joint 103, an intermediate shaft 104 and the like, and is converted to linear motion by the steering gear unit 105. Steered wheels 107 are given a steering angle by pushing and pulling left and right tie rods 106 by this linear motion. The steering shaft 102 is rotatably supported with respect to a vehicle body via a steering column device 108.

FIG. 17 and FIG. 18 illustrate a steering column device 108a as described in JP2016-165935 (A). The steering column device 108a includes a tilt mechanism and a telescopic mechanism for enabling adjustment of the position of a steering wheel, and an impact absorbing mechanism to alleviate an impact load applied to a driver's body in the event of a secondary collision. Among these, the telescopic mechanism is configured so that the entire length of the steering column 109 may be expanded or contracted by fitting together the rear-side portion of an outer column 110 arranged on a front side with the front-side portion of an inner column 111 arranged on a rear side such that relative displacement is possible in the axial direction.

The outer column 110 has a slit 112 that extends in the axial direction on a lower surface of a rear-side portion thereof, and a pair of sandwiched portions 113 that are arranged at positions sandwiching the slit 112 from both sides in the width direction. The inner column 111 has an engaged member 114 that is supported by and fixed to a portion of a lower surface thereof that exists inside the slit 112. In the steering column device 108a, a cam member 116 is externally fitted and fixed to an intermediate portion in the axial direction of an adjusting rod 115 arranged so as to penetrate the pair of sandwiched portions 113 in the width direction.

In order to maintain the adjusted position of the steering wheel, an adjusting lever 117 is swung so as to increase a width dimension of a cam device 118, so that the pair of sandwiched portions 113 are strongly pressed from both sides in the width direction by a pair of support plate portions 120 of a vehicle-body-side bracket 119. At the same time, the cam member 116 is rotated so as to pivotally displace an engaging member 121 around a supporting axis 122 that is supported by the pair of sandwiched portions 113 on both end portions thereof in the axial direction, so that an engaging convex portion 123 of an engaging member 121 is engaged with a concave portion of the engaged member 114 that is supported by and fixed to the inner column 111. Due to this, the inner column 111 is prevented from displacing in the axial direction with respect to the outer column 110.

The supporting axis 122 has a breakage expected portion that is to be broken by an impact load applied in the forward direction to the inner column 111 in the event of a secondary collision. In other words, when the breakage expected portion is broken by applying an impact load in the forward direction to the inner column 111 in the event of a secondary collision, the inner column 111 is released forward, which allows the steering wheel 101 to displace forward.

The steering column device 108a further includes a rotation prevention mechanism for preventing relative rotation between the outer column 110 and the inner column 111. This rotation prevention mechanism is configured with a concave groove 124 provided on an end portion on an upper side of an inner-circumferential surface of the outer column 110 and extending in the axial direction, and a rotation prevention member 125 supported by and fixed to an upper surface of the inner column 111 and engaging with the concave groove 124.

CITATION LIST

Patent Literature

[Patent Literature 1] JP2016-165935 (A)

SUMMARY OF INVENTION

Technical Problem

In the steering column device 108a as described in JP2016-165935 (A), the slit 112 extending in the axial direction is formed on the lower surface of the outer column 110, and furthermore the concave groove 124 extending in the axial direction is formed on the end portion on the upper side of the inner-circumferential surface of the outer column 110. Due to this, in order to secure a length of the concave groove 124, the slit 112 is also required to be long enough for processing, resulting in a disadvantage in the aspect of securing a strength of the outer column 110.

In view of the circumstances described above, an object of the present invention is to achieve a structure of a steering column device that may easily enhance a processability of an outer column thereof and secure a strength of the outer column.

Solution to Problem

The steering column device of one aspect of the present invention includes an inner column, an outer column, a vehicle-body-side bracket, an adjusting rod, a pair of pressing portions, an expansion/contraction device, a telescopic friction plate, a release bracket, and a support bracket.

The outer column has a rear-side portion in which a front-side portion of the inner column is internally fitted, a slit extending in an axial direction thereof, a pair of sandwiched portions arranged at positions sandwiching the slit from both sides in a width direction thereof, and a pair of column-side through holes that penetrate each of the pair of sandwiched portions in the width direction.

The vehicle-body-side bracket has a pair of support plate portions sandwiching the pair of sandwiched portions, and a pair of vehicle-body-side through holes provided in portions of the pair of support plate portions that are aligned with each other.

The adjusting rod is inserted through the pair of column-side through holes and the pair of vehicle-body-side through holes.

The pair of pressing portions are arranged on portions of the adjusting rod that protrude from outside surfaces of the pair of support plate portions.

The expansion/contraction device is configured to expand or contract a distance between the pair of pressing portions.

The telescopic friction plate is sandwiched in at least any of a portion between an inside surface of the pair of support plate portions and an outside surface of the pair of sandwiched portions, and a portion between an outside surface of the pair of support plate portions and an inside surface of the pair of pressing portions, and has a telescopic elongated hole through which the adjusting rod is inserted.

The release bracket is arranged inside the slit and is supported by and fixed to the inner column.

The support bracket has a mounting portion that is joined to the release bracket so as to be able to detach due to an impact load that is applied to the inner column during a secondary collision, and a support arm portion that supports the telescopic friction plate.

Preferably the steering column device further includes a plate spring portion that is sandwiched in at least any of portions between inside surfaces on both sides in the width direction of the slit and outside surfaces on both sides in the width direction of the release bracket, and is able to be elastically deformed in the width direction. In this case, the plate spring portion may be a portion of an electricity-carrying plate that is configured to establish an electrically conductive connection between the inner column and the outer column.

A contact part between the release bracket and the support bracket and the center axis of the adjusting rod preferably have approximately the same height, most preferably have the same height, from the center axis of the inner column in the radial direction of the inner column.

The inner column may include an engagement hole, and a mounting hole that is arranged separate from the engagement hole in a front-rear direction thereof; the release bracket may include a first fixed-side through hole, a second fixed-side through hole that is arranged separate from the first fixed-side through hole in the front-rear direction, a third fixed-side through hole that is arranged opposite to the first fixed-side through hole across the second fixed-side through hole, and an engaging convex portion that protrudes inward in the radial direction of the inner column so as to have a cylindrical shape surrounding the second fixed-side through hole; and the mounting portion of the support bracket may include a first releasing-side through hole, and a second releasing-side through hole that is arranged separate from the first releasing-side through hole in the front-rear direction. In this case, the engaging convex portion is engaged with the engagement hole, and a fixing member such as a screw, a bolt and a nut, and the like is inserted through or screwed into the first fixed-side through hole and the mounting hole, so that the release bracket is supported by and fixed to the inner column, and coupling members are respectively inserted (press-fitted) through both inner sides of the second fixed-side through hole and the first releasing-side through hole, and through both inner sides of the third fixed-side through hole and the second releasing-side through hole, so as to be able to be sheared due to an impact load that is applied to the inner column during a secondary collision, so that the support bracket is detachably joined to the release bracket.

Effect of Invention

The steering column device of an aspect of the present invention may easily enhance a processability of an outer column thereof and secure a strength of the outer column compared with a structure as described in JP2016-165935 (A).

BRIEF DESCRIPTION OF DRAWINGS

FIG. 1 is a perspective view of a steering column device of an example of an embodiment of the present invention.

DESCRIPTION OF EMBODIMENTS

Figure 16:
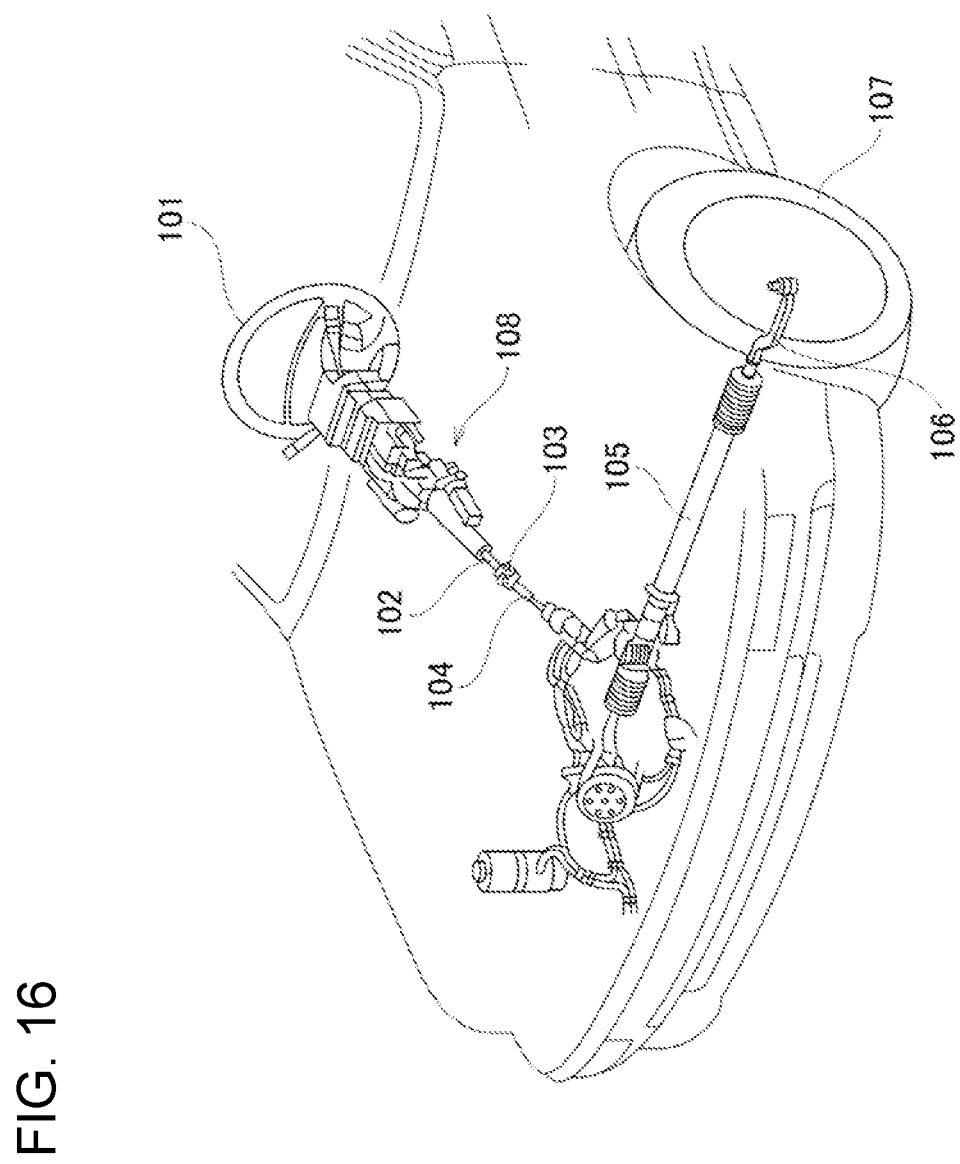
FIG. 16 is a perspective view illustrating an example of a conventional structure of a steering device.
Figure 17:
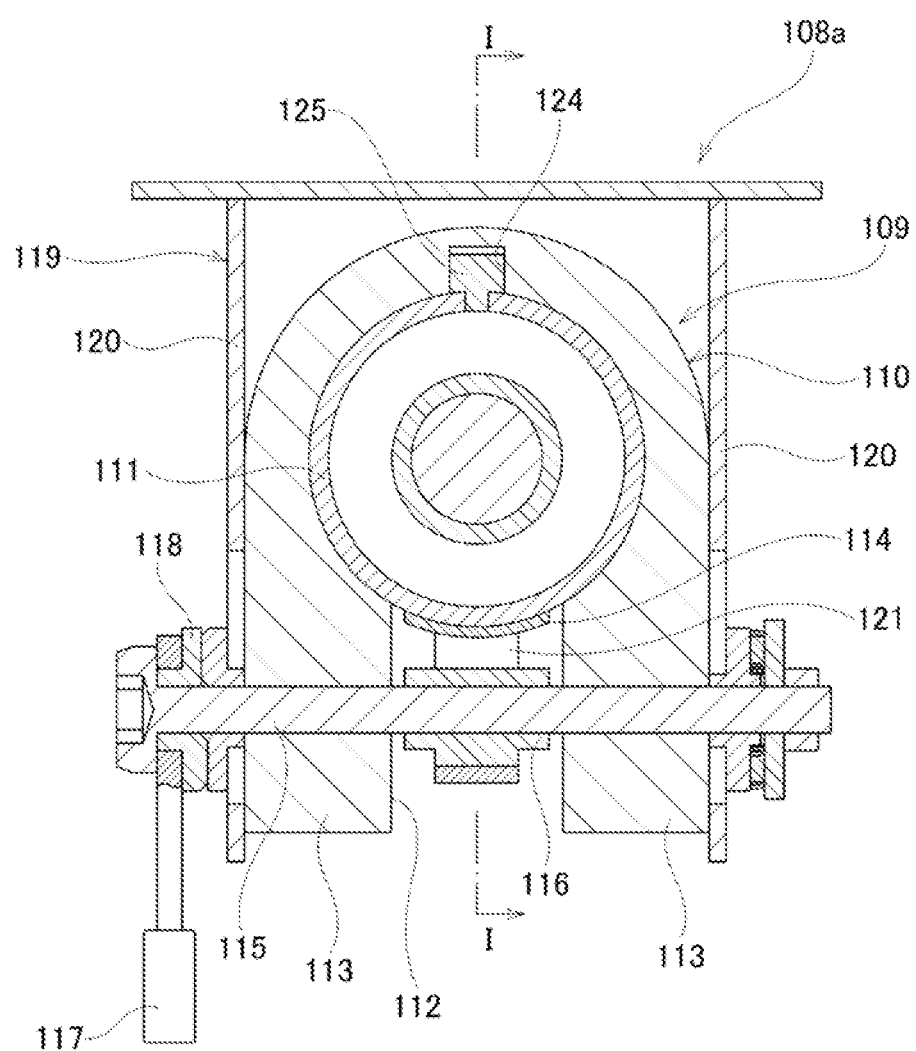
FIG. 17 is a sectional view illustrating an example of a conventional structure of a steering column device.
Figure 18:
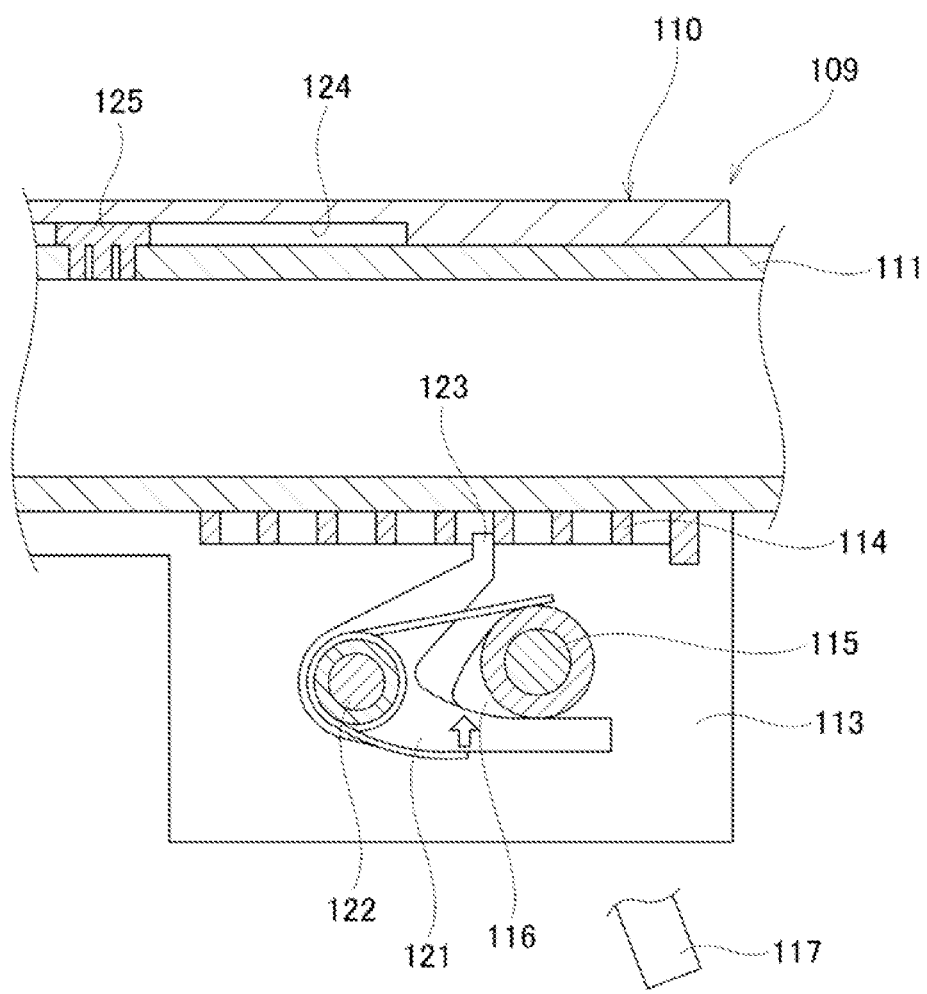
FIG. 18 is a sectional view taken along a line I-I of FIG. 17, in which a steering shaft is omitted.

FIG. 1 to FIG. 15 illustrate an example of an embodiment of the present invention. A steering column device 1 of this example is for rotatably supporting a steering shaft 2, by which a steering wheel 101 (see FIG. 16) is supported at the end portion on the rear side, with respect to a vehicle body, and includes a tilt mechanism for adjusting the vertical position of the steering wheel 101, a telescopic mechanism for adjusting the front-rear position of the steering wheel 101, and an impact absorbing mechanism for alleviating an impact load applied to a driver's body in the event of a secondary collision. Note that the vertical direction, the front-rear direction, and the width direction refer to the vertical direction, the front-rear direction, and the width direction in a state where the steering column device 1 is assembled in a vehicle, unless specified otherwise.

The steering shaft 2 has a structure in which an upper shaft 3 and a lower shaft 4 are combined by spline engagement or the like so that torque may be transmitted and the entire length may be expanded or contracted. The steering wheel 101 is supported by and fixed to the end portion on the rear side of the upper shaft 3. Note that, in this example, a key lock collar 5 of a steering lock device is externally fitted and fixed to an intermediate portion in the axial direction of the upper shaft 3.

The steering column device 1 includes a steering column 6, a vehicle-body-side bracket 7, an adjusting rod 8, an adjusting lever 9 and a cam device 10 of an expansion/contraction device, a telescopic friction plate 11, a release bracket 12, a support bracket 13, and an electricity-carrying plate 14.

The steering column 6 is configured so that the entire length may be expanded or contracted by fitting the front-side portion of the inner column 15 arranged on the rear side and the rear-side portion of the outer column 16 arranged on the front side so that relative displacement is possible in the axial direction.

Figure 2:
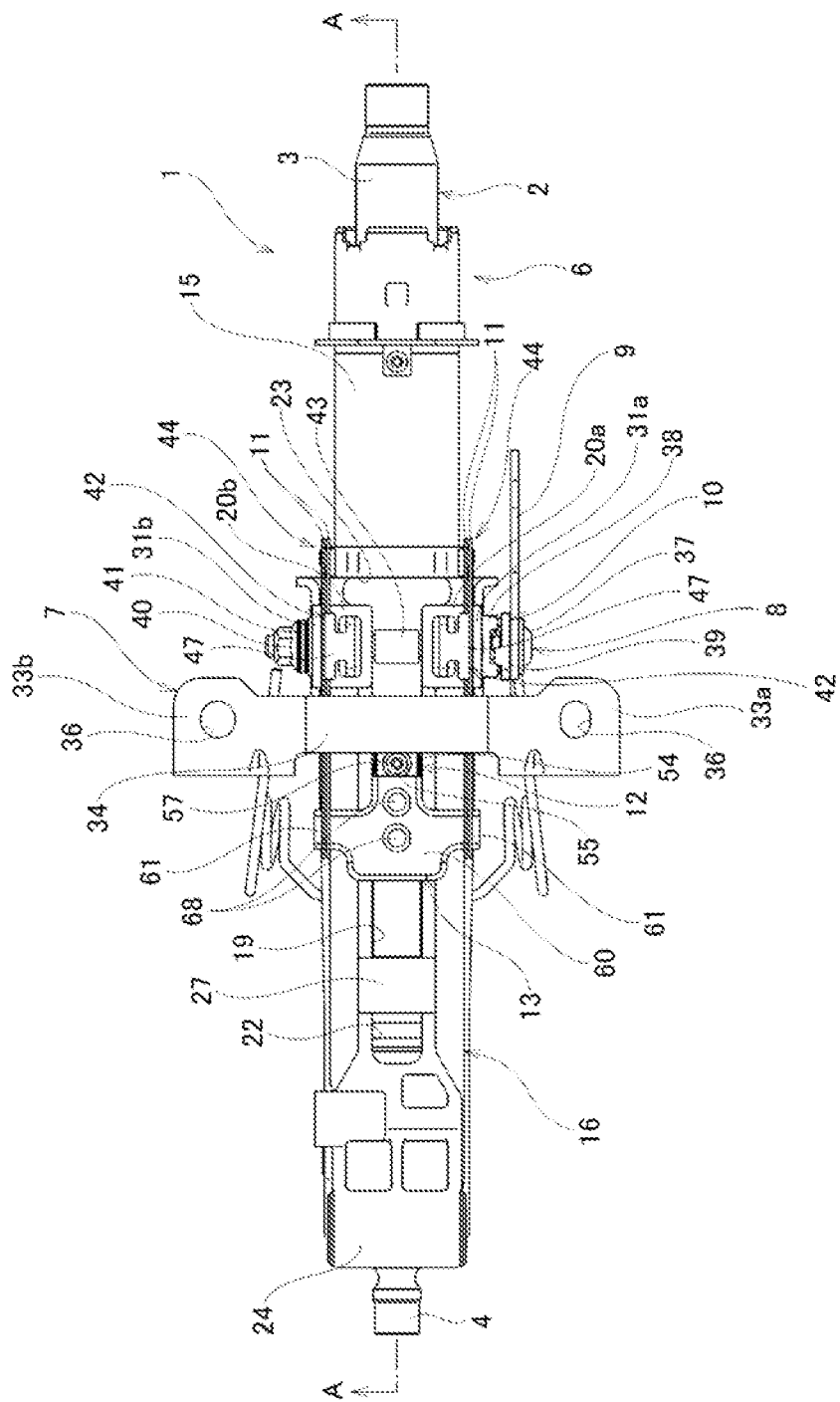
FIG. 2 is a plan view of the steering column device illustrated in FIG. 1 in the state where a front-rear position of a steering wheel has been moved to an intermediate position within an adjustable range.
Figure 3:
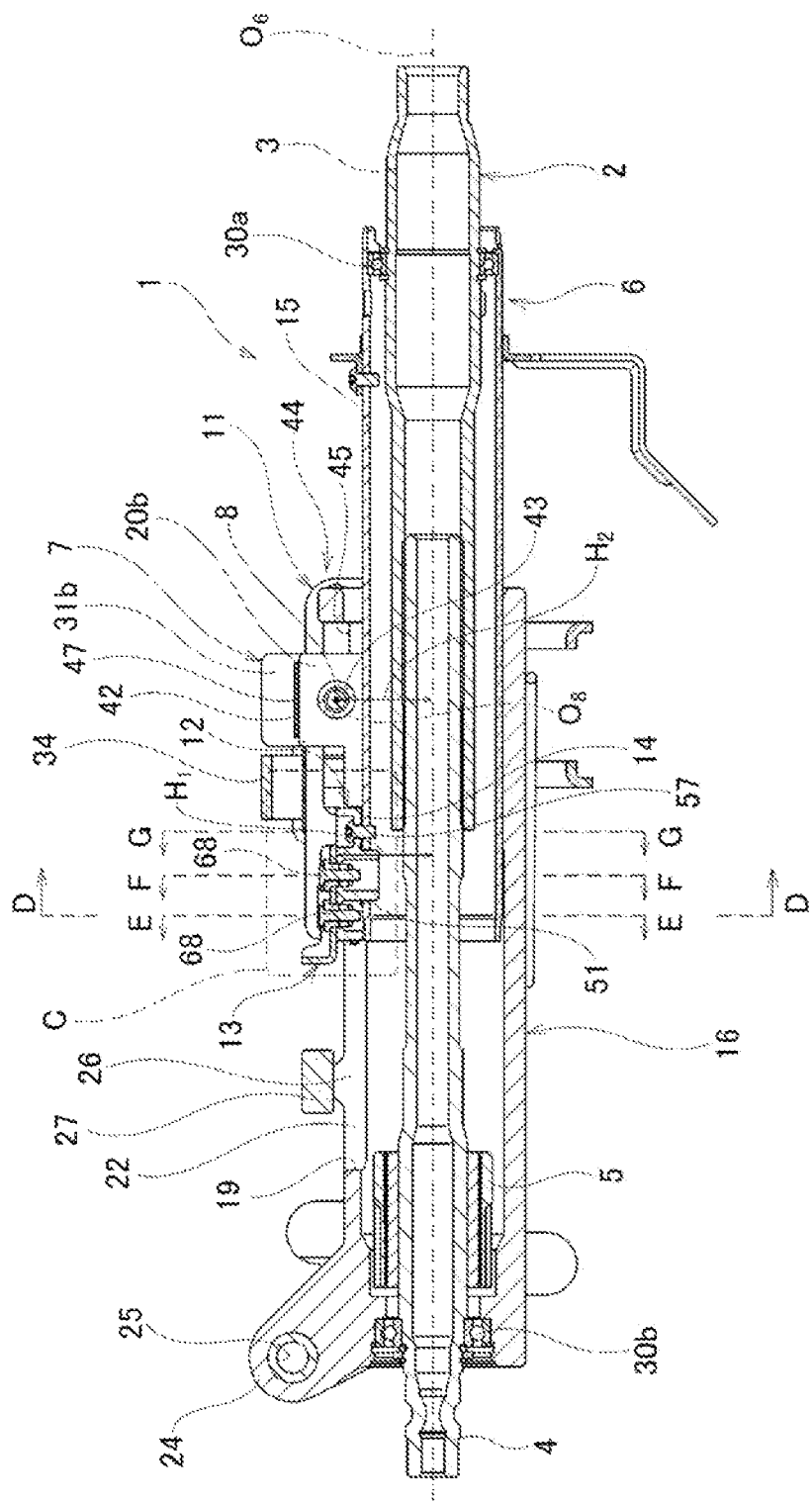
FIG. 3 is a sectional view taken along a line A-A of FIG. 2.
Figure 4:
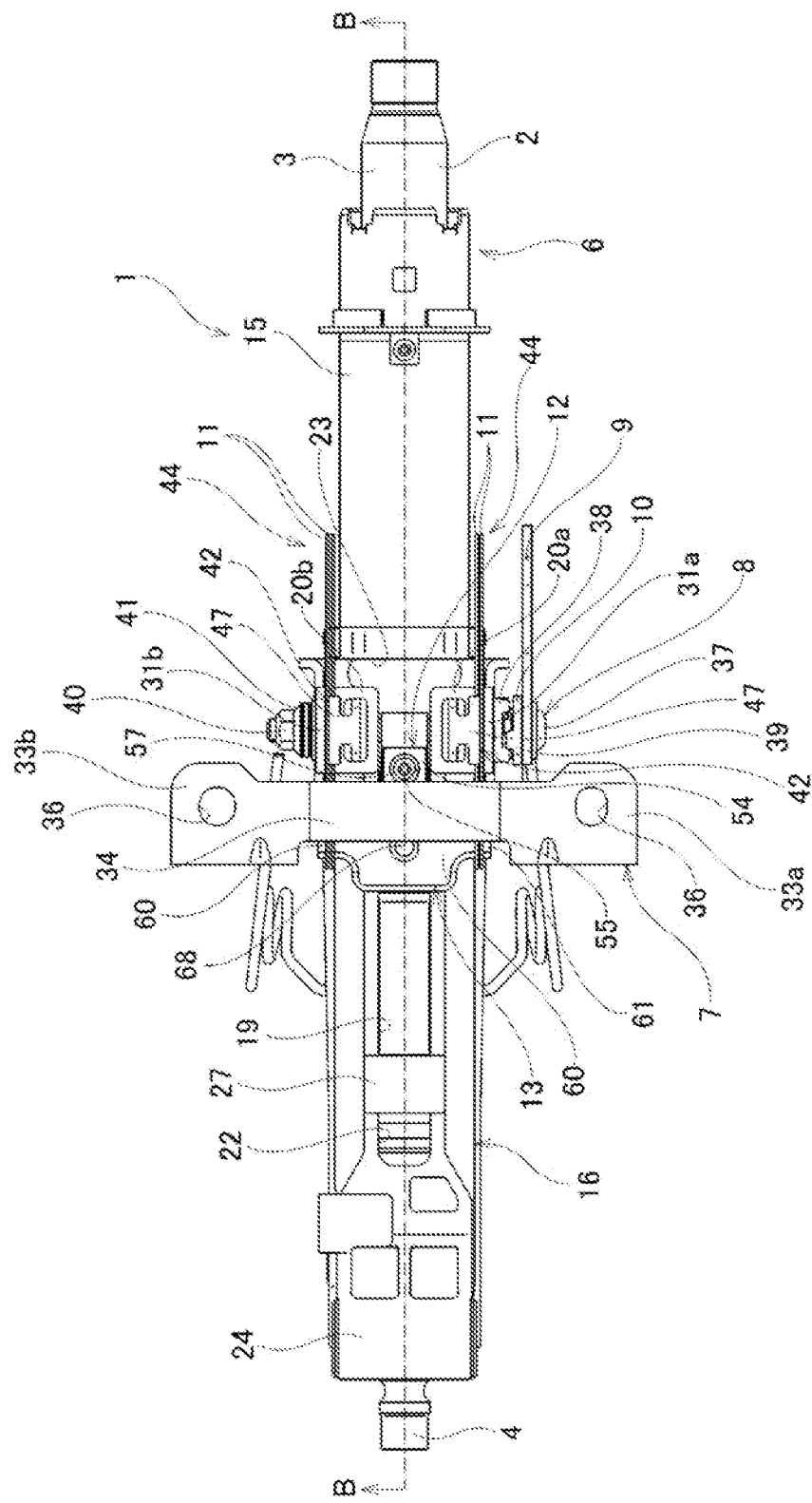
FIG. 4 is a plan view of the steering column device illustrated in FIG. 1 in the state where the front-rear position of the steering wheel has been moved to a rear-end position within the adjustable range.
Figure 5:
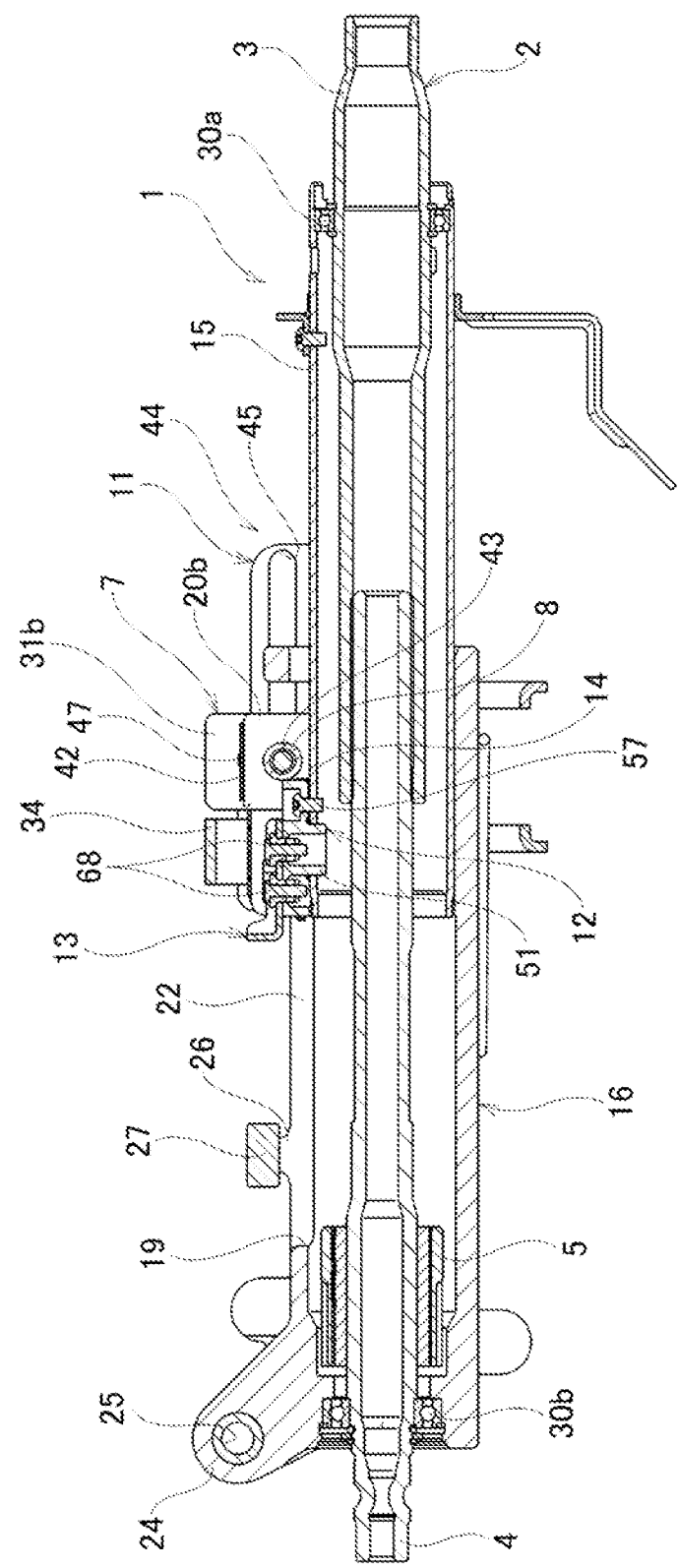
FIG. 5 is a sectional view taken along a line B-B of FIG. 4.
Figure 6:
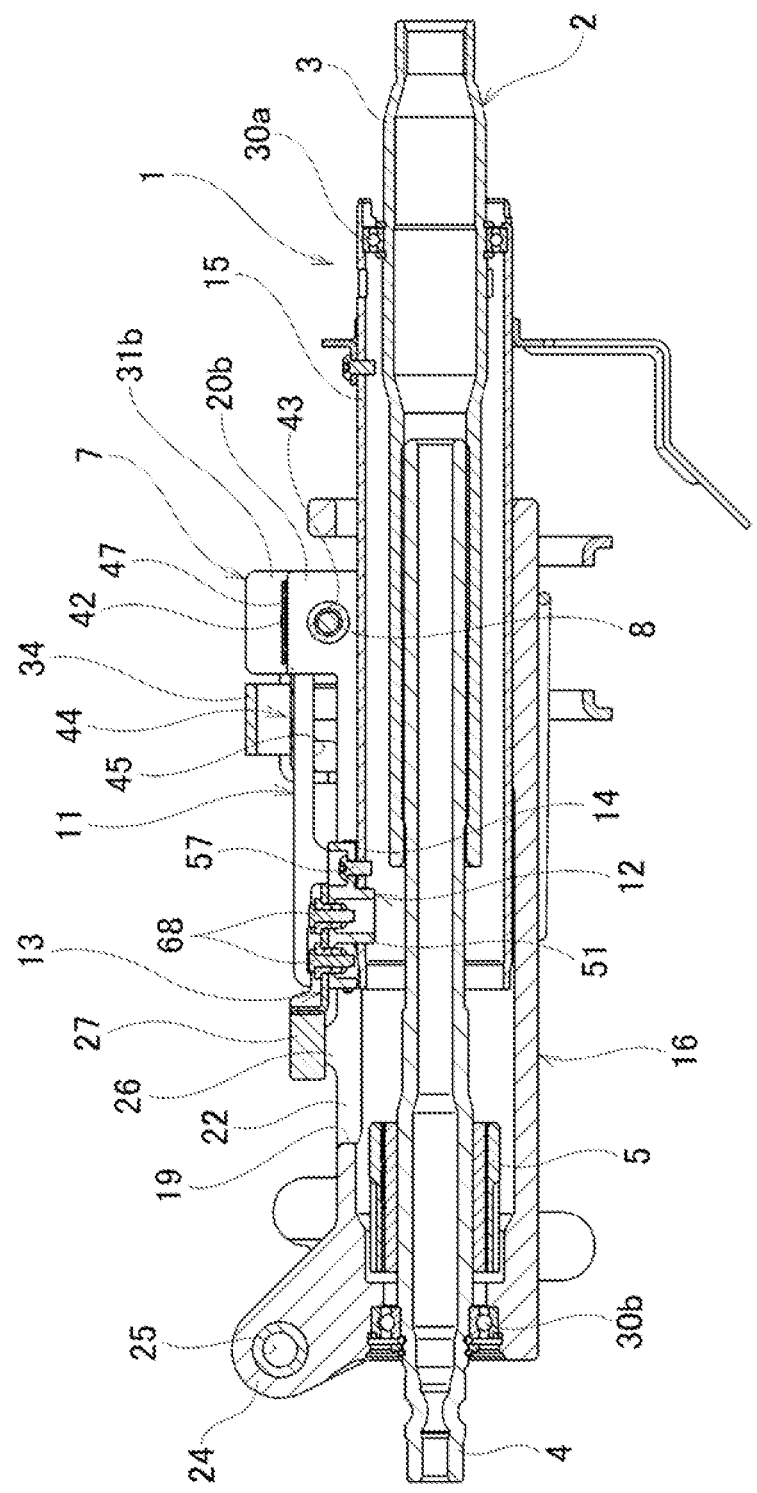
FIG. 6 is a view of the steering column device illustrated in FIG. 1, which is similar to FIG. 3, in the state where the front-rear position of the steering wheel has been moved to a front-end position within the adjustable range.
Figure 7:
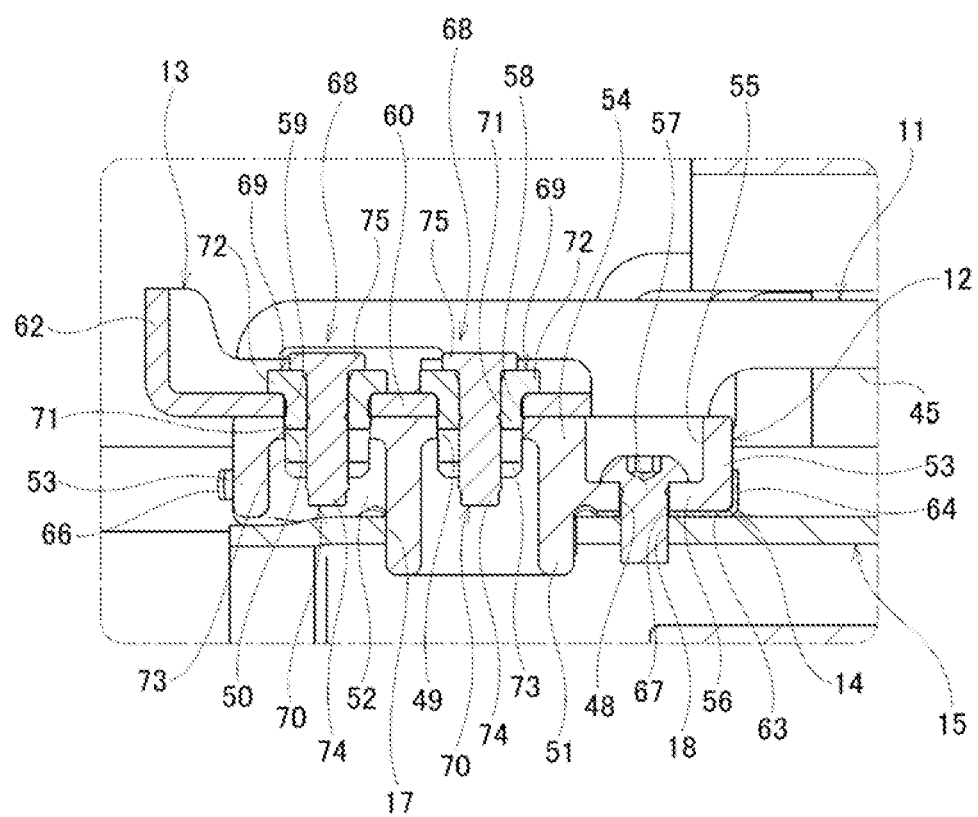
FIG. 7 is an enlarged view of a section C of FIG. 3.
Figure 8:
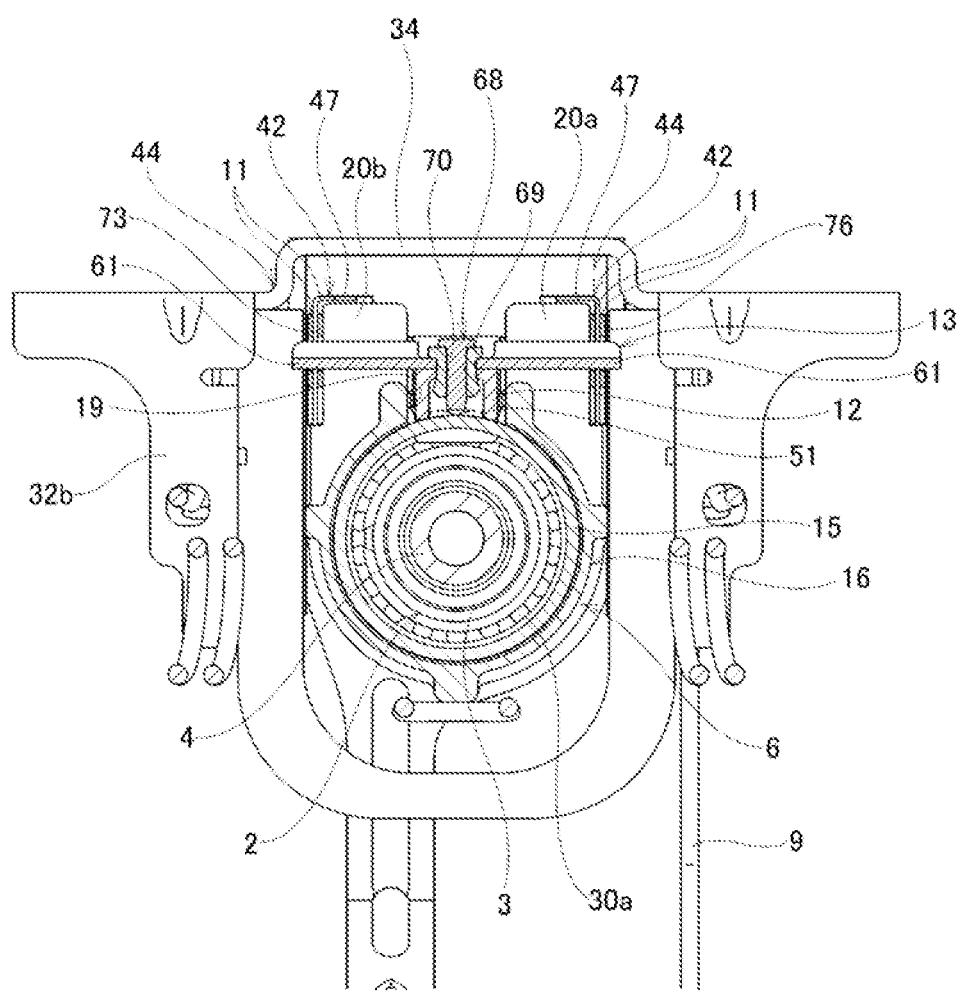
FIG. 8 is a sectional view taken along a line D-D of FIG. 3.
Figure 9:
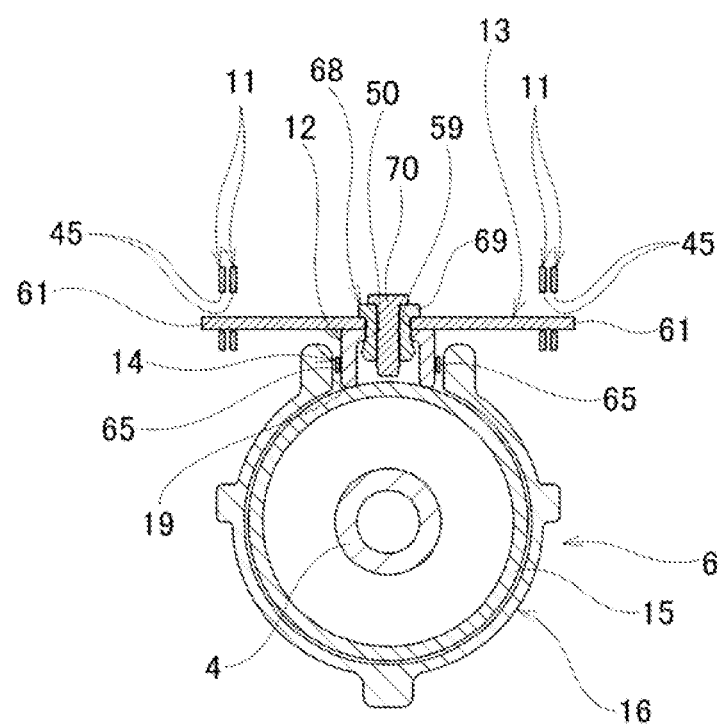
FIG. 9 is a sectional view taken along a line E-E of FIG. 3.
Figure 10:
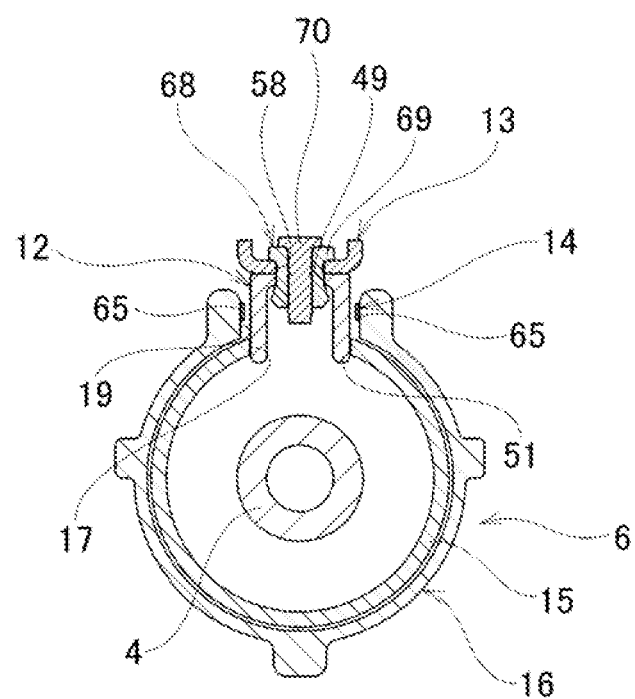
FIG. 10 is a sectional view taken along a line F-F of FIG. 3.
Figure 11:
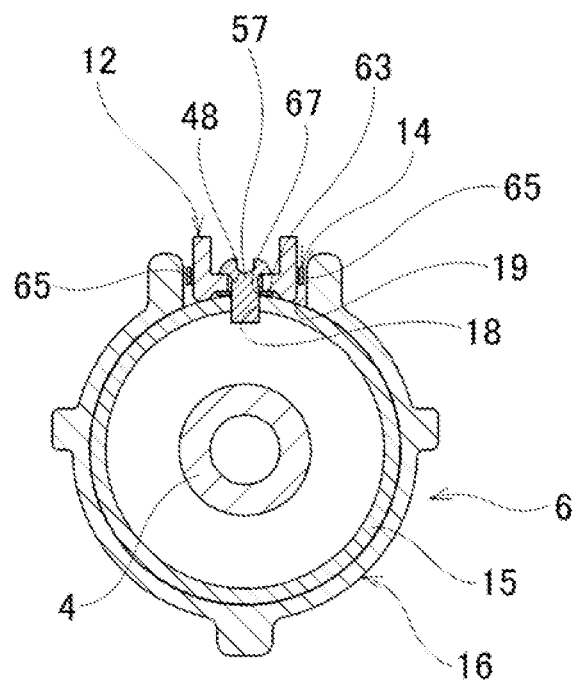
FIG. 11 is a sectional view taken along a line G-G of FIG. 3.
Figure 12:
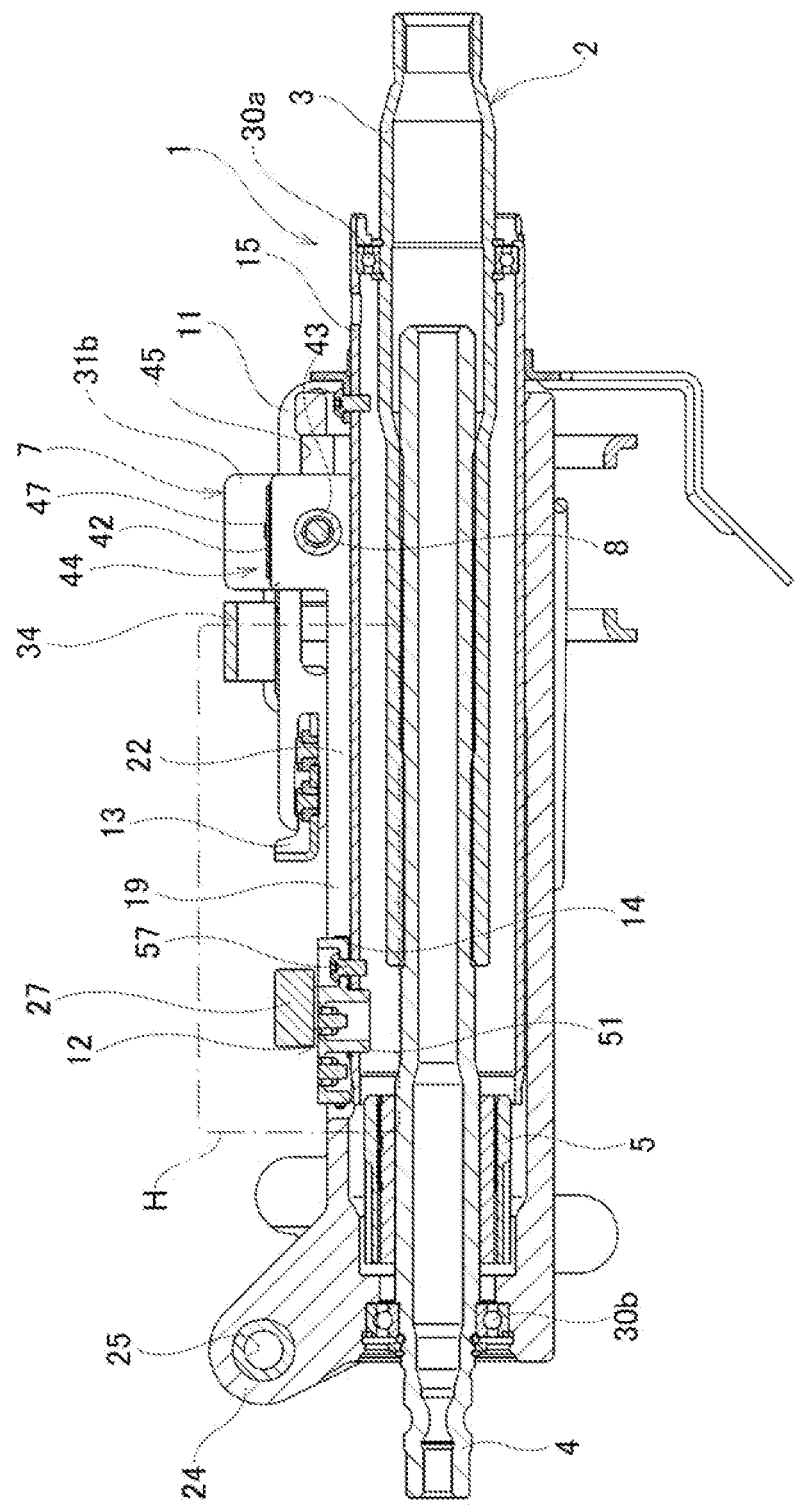
FIG. 12 is a view of the steering column device illustrated in FIG. 1, which is similar to FIG. 3, in the state where a secondary collision has occurred.
Figure 13:
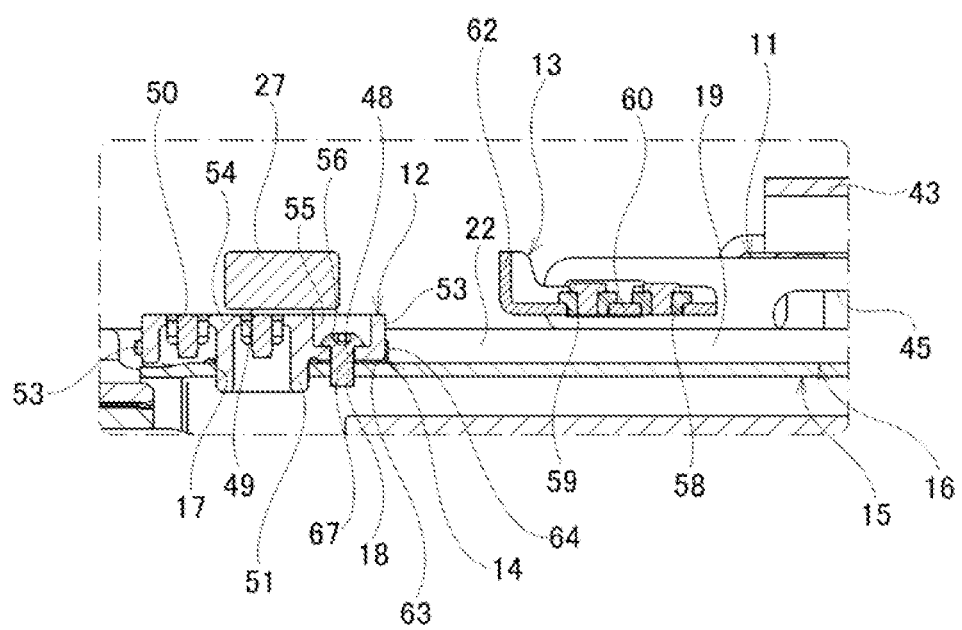
FIG. 13 is an enlarged view of a section H of FIG. 12.

The inner column 15 is formed in a tubular shape. As illustrated in FIG. 7, the inner column 15 includes an engagement hole 17 having a substantially rectangular opening on an upper surface of the front-side portion, and a mounting hole 18 composed of a screw hole and having a female screw portion on an inner-circumferential surface thereof, which is formed on a portion of the upper surface of the front-side portion that is more rear side than the engagement hole 17. The inner column 15 of this example is coated with a coating layer made of a synthetic resin on an outer-circumferential surface thereof. Such a coating layer has a function to suppress a sliding resistance against the outer column 16.

The outer column 16 is formed in a tubular shape, and has a slit 19, a pair of sandwiched portions 20a, 20b, and a pair of column-side through holes (not illustrated).

The slit 19 has a function to allow the inner diameter of the rear-side portion of the outer column 16 to be expanded or contracted. The slit 19 is formed on the upper surface of from an intermediate portion to the rear-side portion of the outer column 16 extending in the axial direction. As illustrated FIG. 2 and FIG. 4, the slit 19 of this example has approximately T-shaped opening when viewed from the radial direction. The slit 19 of this example is composed of a main slit portion 22 and a auxiliary slit portion 23 that are arranged on the upper surface of from the intermediate portion to the rear-side portion of the outer column 16. The main slit portion 22 penetrates the outer column 16 in the radial direction and extends in the axial direction. The auxiliary slit portion 23 penetrates the outer column 16 in the radial direction and extends in the circumferential direction. The end portion on the rear side of the main slit portion 22 is opened to an intermediate portion in the circumferential direction of the auxiliary slit portion 23. Although not opened in this example, the end portion on the rear side of the slit 19 may be opened in the end surface on the rear side of the outer column 16.

The pair of sandwiched portions 20a, 20b is arranged at positions that sandwich the rear-side portion of the slit 19 from both sides in the width direction. The pair of column-side through holes are merely circular holes that are formed in portions of the pair of sandwiched portions 20a, 20b that are aligned with each other (in other words, arranged in the pair of sandwiched portions 20a, 20b so as to be coaxial with each other), and are formed so as to penetrate each of the pair of sandwiched portions 20a, 20b in the width direction.

The outer column 16 has a rocking support bracket portion 24 that extends forward and upward on a portion of the end portion of the front side that is more front side than the slit 19. The rocking support bracket portion 24 has a rocking support hole (circular hole) 25 that has a circular cross-sectional shape and penetrates this portion in the width direction of a vehicle body. A tilt shaft that is supported by the vehicle body on end portions thereof is inserted through the rocking support hole 25, so that the outer column 16 is supported by the vehicle body so as to be able to rock around the tilt shaft.

The outer column 16 further has a pair of protruding piece portions 26 that protrude upward at portions sandwiching the front-side portion of the slit 19 from both sides in the width direction. In this example, a stopper member 27 is attached so as to span between the pair of protruding piece portions 26. The stopper member 27 is made of a polymer material such as a synthetic resin, a rubber or the like, and has concave portions 28 that are recessed upward at the end portions on both sides in the width direction on the lower surface thereof. By inserting the protruding piece portions 26 in the concave portions 28 (in other words, by covering the protruding piece portions 26 with the concave portions 28), the stopper member 27 is supported by the outer column 16 and arranged above the intermediate portion in the axial direction of the slit 19 of the outer column 16.

Figure 1:
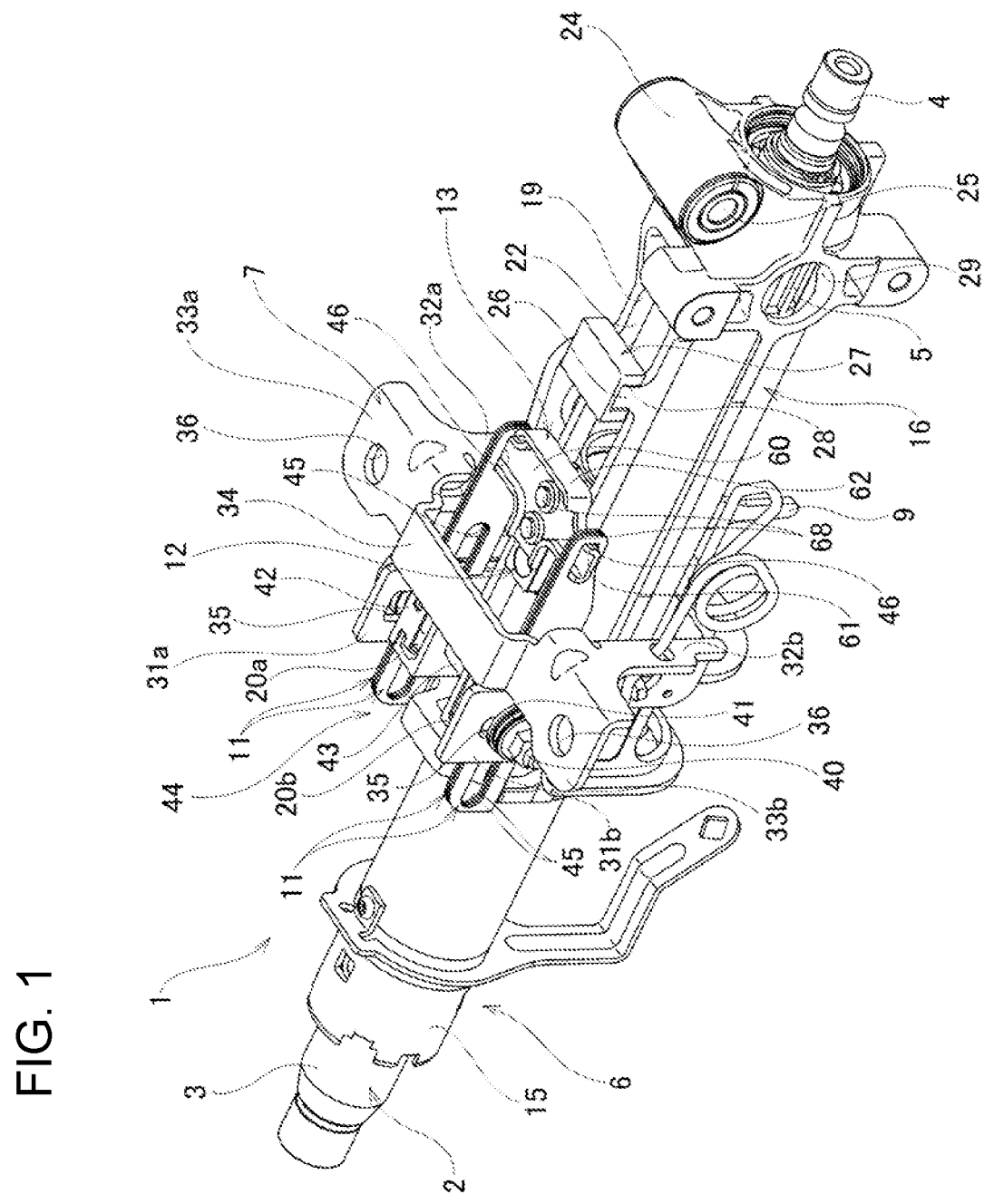
Figure 14:
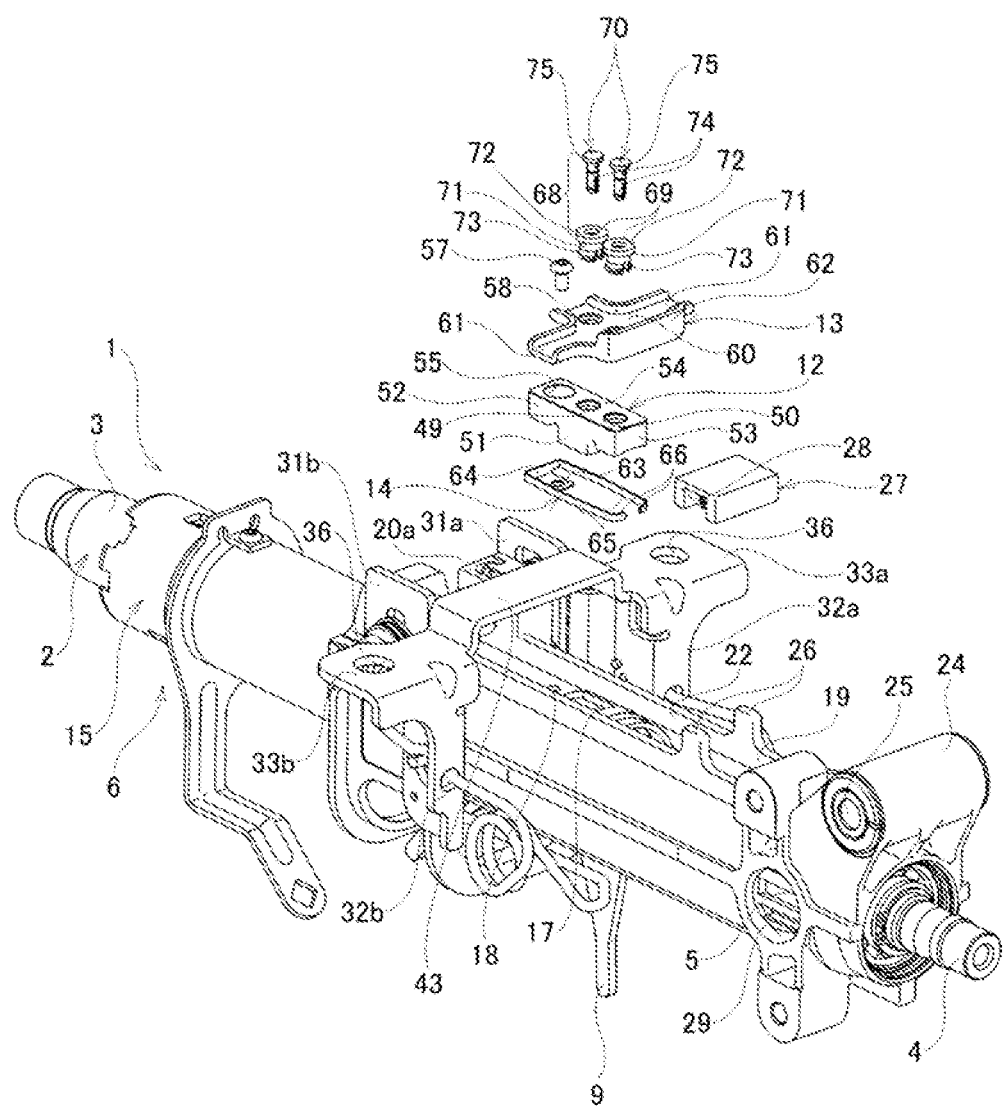
FIG. 14 is an exploded perspective view of the steering column device illustrated in FIG. 1.
Figure 15:
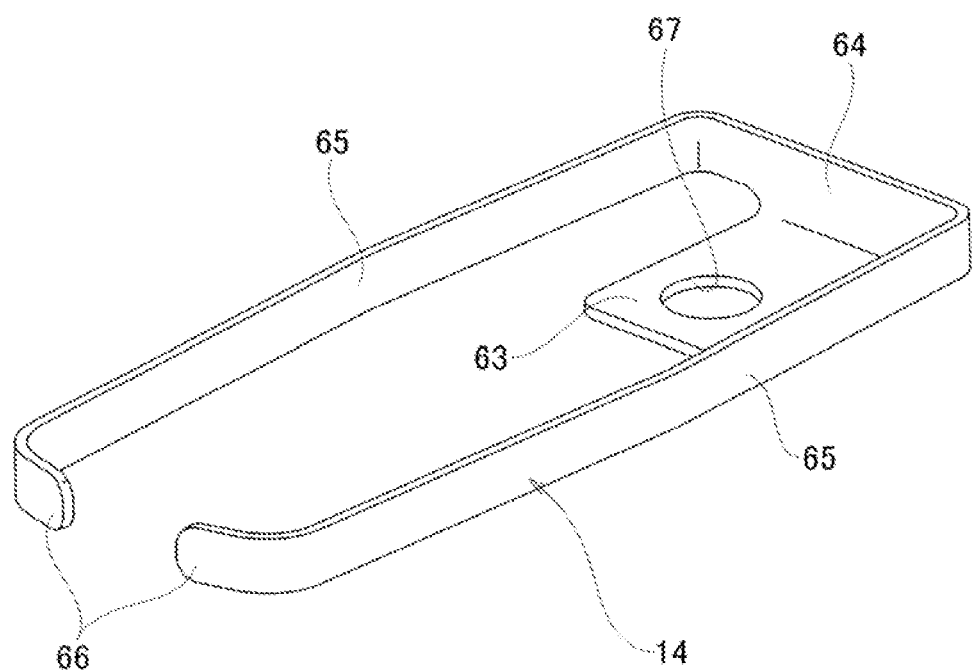
FIG. 15 is a perspective view of an electricity-carrying plate of the steering column device illustrated in FIG. 1.

Moreover, as illustrated in FIG. 1 and FIG. 14, the outer column 16 further has a locking through hole 29 in a front-side portion thereof. A lock unit (key lock cylinder) (not illustrated) is supported by and fixed to a peripheral portion of the locking through hole 29 on the outer-circumferential surface of the outer column 16. When the steering lock device is activated (when the key is locked), the lock pin of the lock unit is displaced toward the inside in the radial direction of the steering column 6 through the locking through hole 29, and is engaged with an engaging recess portion that is formed on the outer-circumferential surface of the key lock collar 5, so that rotation of the steering shaft 2 is substantially prevented.

The rear-side portion of the upper shaft 3 of the steering shaft 2 is rotatably supported by the end portion on the rear side of the inner column 15 via a rolling bearing 30a, and the front-side portion of the lower shaft 4 of the steering shaft 2 is rotatably supported by the end portion on the front side of the outer column 16 via a different rolling bearing 30b. As a result, the steering shaft 2 is rotatably supported on the inner-diameter side of the steering column 6.

The vehicle-body-side bracket 7 has a function to support an intermediate portion in the axial direction of the steering column 6 so as to be able to switch between an unclamped state in which it is possible to adjust the vertical position and the front-rear position of the steering wheel 101, and a clamped state in which the adjusted position of the steering wheel 101 is maintained. The vehicle-body-side bracket 7 has a pair of support plate portions 31a, 31b, a pair of front-side plate portions 32a, 32b, a pair of top plate portions 33a, 33b, a connecting plate portion 34, and a pair of vehicle-body-side through holes 35.

The pair of support plate portions 31a, 31b is arranged so as to sandwich the pair of sandwiched portions 20a, 20b of the outer column 16 from both sides in the width direction. Each of the pair of front-side plate portions 32a, 32b is bent at right angles outward in the width direction from the end portion on the front side of each of the support plate portions 31a, 31b. Each of the pair of top plate portions 33a, 33b is bent at right angles rearward from the end portion on the upper side of each of the front-side plate portions 32a, 32b, and has a bracket-side mounting hole 36. The connecting plate portion 34 connects the end portions on the inner sides in the width direction of the top plate portions 33a, 33b with each other. The vehicle-body-side bracket 7 is supported by and fixed to a vehicle body with bolts that are inserted through each of the bracket-side mounting holes 36 of the pair of top plate portions 33a, 33b.

The pair of vehicle-body-side through holes 35 are formed in portions of the pair of support plate portions 31a, 31b that are aligned with each other. In this example, each of the vehicle-body-side through holes 35 is composed of an elongated hole extending in the vertical direction. More specifically, each of the vehicle-body-side through holes 35 extends in an arc direction centered on the tilt shaft.

The adjusting rod 8 is inserted in the width direction through the pair of column-side through holes and the pair of vehicle-body-side through holes 35. The adjusting rod 8 has a head portion 37 on the end portion on one side (right side in FIG. 2 and FIG. 4) in the axial direction of the adjusting rod 8. An adjusting lever 9 and a cam device 10 are arranged in that order from the outside in the width direction around a portion on the one side in the axial direction of the adjusting rod 8 that protrudes from the outside surface of one support plate portion 31a (right one in FIG. 2 and FIG. 4) of the pair of support plate portions 31a, 31b. In other words, the adjusting lever 9 and the cam device 10 are arranged between the head portion 37 and the outside surface of the support plate portion 31a.

The cam device 10 includes a driven-side cam 38 that is arranged on the inside in the width direction and a drive-side cam 39 arranged on the outside in the width direction.

The driven-side cam 38 is made of sintered metal, has a driven-side-cam surface, which is an uneven surface in the circumferential direction, on the outside surface in the width direction of the vehicle body, and a substantially rectangular engaging convex portion that protrudes toward the inside in the width direction on the inside surface. The driven-side cam 38 is externally fitted onto the adjusting rod 8 so as to allow relative rotation with respect to the adjusting rod 8 and relative displacement in the axial direction of the adjusting rod 8. The driven-side cam 38 causes the engaging convex portion to engage with the vehicle-body-side through hole 35 formed in the one support plate portion 31a so that only displacement along the vehicle-body-side through holes 35 is possible.

The drive-side cam 39 is made of sintered metal and has a drive-side-cam surface, which is an uneven surface in the circumferential direction, on the inside surface in the width direction of the vehicle body. The drive-side cam 39 is fixed to the base portion of the adjusting lever 9, and rotates back-and-forth according to the back-and-forth swinging movement of the adjustment lever 9. Note that the base portion of the adjusting lever 9 and the drive-side cam 39 may be externally fitted on the adjusting rod 8 so as to rotate integrally with the adjusting rod 8, or may be externally fitted on the adjusting rod 8 so as to be able to rotate relative to the adjusting rod 8.

A nut 40 and a thrust bearing 41 are arranged in that order from the outside in the width direction around a portion on the other side in the axial direction of the adjusting rod 8 that protrudes from the outside surface of the other support plate portion 31b (left one in FIG. 2 and FIG. 4) of the pair of support plate portions 31a, 31b. The nut 40 is screwed into the end portion on the other side in the axial direction of the adjusting rod 8.

In the steering column device 1 of this example, by expanding or contracting the distance between the driven-side cam 38 of the cam device 10 and the thrust bearing 41 by swinging the adjusting lever 9 to expand or contract a dimension in the axial direction of the cam device 10, or in other words, a dimension of the cam device 10 in the width direction of the vehicle body, the distance between the pair of support plate portions 31a, 31b can be expanded or contracted. In other words, in this example, the driven-side cam 38 of the cam device 10 and the thrust bearing 41 correspond to a pair of pressing portions, and an expansion/contraction device is configured by the adjusting lever 9 and the cam device 10.

In this example, a sleeve 43 made of a polymer material such as a synthetic resin, a rubber or the like is externally fitted around a portion of the intermediate portion of the adjusting rod 8 located between the inside surfaces of the pair of sandwiched portions 20a, 20b.

The telescopic friction plate 11 has a function to increase the holding force for holding the steering column 6 with respect to the vehicle-body-side bracket 7. In this example, a friction plate unit 44 is configured by sandwiching one fixed-side friction plate 42 between a pair of telescopic friction plate 11, and the friction plate unit 44 is arranged in each of portions located between the outside surfaces in the width direction of the pair of sandwiched portions 20a, 20b and the inside surfaces in the width direction of the pair of support plate portions 31a, 31b, so that the holding force for holding the steering column 6 is increased.

Each telescopic friction plate 11 is made of metal plate such as steel plate or the like having a large friction coefficient with respect to the inside surfaces in the width direction of the support plate portions 31a, 31b and the outside surfaces in the width direction of the sandwiched portions 20a, 20b, and is substantially rectangular when viewed from the width direction. Each telescopic friction plate 11 has a telescopic elongated hole 45 extending in the front-rear direction in a range from the intermediate portion to the rear-side portion, and a substantially rectangular support hole 46 in the front-side portion. The adjusting rod 8 is inserted through the telescopic elongated hole 45 of each of the telescopic friction plates 11, and the front-side portion of each of the telescopic friction plates 11 is supported by the inner column 15 via the release bracket 12 and the support bracket 13.

Each fixed-side friction plate 42 is made of metal plate such as a steel plate or the like having a large friction coefficient with respect to the side surfaces of the telescopic friction plates 11, and has a side plate portion 76 held between the pair of telescopic friction plates 11, and a mounting plate portion 47 bent at right angles inward in the width direction from the end portion on the upper side of the side plate portion 76. Each side plate portion 76 has a circular hole through which the adjusting rod 8 is to be inserted. The mounting plate portion 47 is joined and fixed to each of the sandwiched portions 20a, 20b. Therefore, each fixed-side friction plate 42 displaces in synchronization with the adjusting rod 8 when adjusting the vertical position and the front-rear position of the steering wheel 101. In other words, the fixed-side friction plates 42 displace in the vertical direction together with the adjusting rod 8 when adjusting the vertical position of the steering wheel 101, and stay at the same position when adjusting the front-rear position of the steering wheel 101.

The release bracket 12 is arranged inside the slit 19 of the outer column 16, and supported by and fixed to the upper surface of the inner column 15. The release bracket 12 has a first fixed-side through hole 48, a second fixed-side through hole 49 that is arranged on a more front side than the first fixed-side through hole 48, a third fixed-side through hole 50 that is arranged on a more front side than the second fixed-side through hole 49, and an engaging convex portion 51 that protrudes downward so as to have a rectangular cylindrical shape surrounding the second fixed-side through hole 49.

Specifically, the release bracket 12 of this example has a pair of side plate portions 52 that are arranged parallel to each other in the width direction, end plate portions 53 that respectively connect end portions on both front and rear sides of the pair of side plate portions 52 with each other, and a top plate portion 54 that is arranged so as to cover an opening on the upper side of a space having a rectangular columnar shape that is surrounded by the side plate portions 52 and the end plate portions 53.

The top plate portion 54 has a recessed hole 55 that is recessed downward, and a bottom plate portion 56 that covers a bottom portion of the recessed hole 55, in the rear-side portion. The bottom plate portion 56 has the first fixed-side through hole 48. The top plate portion 54 has the second fixed-side through hole 49 in the intermediate portion in the front-rear direction, and the third fixed-side through hole 50 in the front-side portion. In this example, the formation position of the first fixed-side through hole 48 is offset downward from the formation positions of the second fixed-side through hole 49 and the third fixed-side through hole 50. In this example, the first fixed-side through hole 48, the second fixed-side through hole 49, and the third fixed-side through hole 50 are all configured as a circular hole. The end portion on the lower side of the engaging convex portion 51 protrudes more downward than the lower surface of the bottom plate portion 56.

The support bracket 13 is joined to the release bracket 12 so as to be able to detach due to an impact load that is applied to the inner column during a secondary collision, and supports the telescopic friction plates 11 so as to be able to displace in the width direction. The support bracket 13 of this example includes a mounting portion 60 having a first releasing-side through hole 58 and a second releasing-side through hole 59 that is arranged on a more front side than the first releasing-side through hole 58, and a pair of support arm portions 61 that extends toward both sides in the width direction from the front-side portion of the mounting portion 60. In other words, the support bracket 13 has an approximately T-shaped planar shape when viewed from the vertical direction. The support bracket 13 of this example is formed by punching a metal plate such as a steel plate or the like having sufficient strength and rigidity by a press. In this example, the support bracket 13 has a reinforcement rib portion 62 that is bent upward from end portions of both sides in the width direction on the rear-side portion and an end portion on a front side of the mounting portion 60, and end portions on both front and rear sides of the support arm portions 61. The reinforcement rib portion 62 improves a flexural rigidity of the support bracket 13.

The electricity-carrying plate 14 is formed by punching and bending a conductive metal plate by a press, and includes a base plate portion 63, a rear-side plate portion 64, a pair of plate spring portions 65, and a pair of bent portions 66.

The base plate portion 63 has a rectangular plate shape and has a through hole 67. The rear-side plate portion 64 is bent at right angles upward from the end portion on the rear side of the base plate portion 63. The pair of plate spring portions 65 is bent at right angles forward from the end portions on both sides in the width direction of the rear-side plate portion 64, and extends forward. Each of the pair of plate spring portions 65 is bent into an approximately V-shape so that the intermediate portion in the front-rear direction is protruded outward in the width direction. The pair of bent portions 66 are bent inward in the width direction from the end portions on the front sides of the pair of plate spring portions 65.

The electricity-carrying plate 14 is supported by and fixed to the upper surface of the inner column 15 at a state where the base plate portion 63 is sandwiched between the upper surface of the inner column 15 and the lower surface of the release bracket 12, and where the outside surface in the width direction of the pair of plate spring portions 65 is in contact with the inside surface of the slit 19 of the outer column 16. The electricity-carrying plate 14 is to establish an electrically conductive connection between the inner column 15 and the outer column 16. In other words, the inner column 15 is in electrical contact with the screw 57 on the inner-circumferential surface of the mounting hole 18, and the screw 57 is in electrical contact with the electricity-carrying plate 14 via the release bracket 12. The pair of plate spring portions 65 of the electricity-carrying plate 14 is in electrical contact with the inside surface of the slit 19 of the outer column 16, and the outer column 16 is grounded (earthed) via the vehicle-body-side bracket 7 and the like.

In the steering column device 1 of this example, the release bracket 12 and the electricity-carrying plate 14 are supported by and fixed to a portion on the upper surface of the inner column 15 that exists inside the slit 19 of the outer column 16, and the release bracket 12 and the support bracket 13 are joined to each other so as to be able to detach due to an impact load that is applied to the inner column 15 during a secondary collision.

Specifically, in this example, the support bracket 13 is joined to the upper surface of the release bracket 12 with coupling members 68 so as to be able to detach due to an impact load that is applied to the inner column 15 during a secondary collision. Each coupling member 68 is made of a synthetic resin, and includes an outer pin 69 and an inner pin 70.

As illustrated in FIG. 7, the outer pin 69 is formed in a tubular shape as a whole, and includes a cylindrical portion 71, an outward-facing flange portion 72 protruding toward the outside in the radial direction from the outer-circumferential surface of the base-end portion (end portion on the upper side of FIG. 7) of the cylindrical portion 71, and a slitted portion 73 arranged adjacent to the tip-end side (lower side of FIG. 7) of the cylindrical portion 71. The slitted portion 73 has slits that open to the end surface on the tip-end side at two positions on opposite sides in the radial direction. Moreover, the shape of the generating line of the stilted portion 73 is a substantially triangular shape. In other words, the outer-diameter dimension of the slitted portion 73 is larger than the outer-diameter dimension of the cylindrical portion 71.

On the other hand, the inner-diameter dimension of the slitted portion 73 is equal to the inner-diameter dimension of the cylindrical portion 71.

The inner pin 70 has a shaft portion 74 and a head portion 75 formed at the base-end portion of the shaft portion 74.

In order to support the support bracket 13 with respect to the upper surface of the release bracket 12, first, the first releasing-side through hole 58 is aligned with the second fixed-side through hole 49, and the second releasing-side through hole 59 is aligned with the third fixed-side through hole 50. In other words, the position in the front-rear direction and the position in the axial direction of the support bracket 13 with respect to the release bracket 12 are adjusted so that the first releasing-side through hole 58 and the second fixed-side through hole 49 are coaxial with each other, and the second releasing-side through hole 59 and the third fixed-side through hole 50 are coaxial with each other. Next, the slitted portions 73 of the outer pins 69 are press-fitted from above into the first releasing-side through hole 58 and the second fixed-side through hole 49, and into the second releasing-side through hole 59 and the third fixed-side through hole 50, while elastically contracting the diameter thereof, and then restored. As a result, the cylindrical portions 71 of the outer pins 69 are arranged inside the first releasing-side through hole 58 and the second fixed-side through hole 49, and inside the second releasing-side through hole 59 and the third fixed-side through hole 50, so that the top plate portion 54 of the release bracket 12 and the mounting portion 60 of the support bracket 13 are sandwiched and held between the outward-facing flange portion 72 and the slitted portion 73.

Next, the shaft portions 74 of the inner pins 70 are press-fitted into the inside in the radial direction of the outer pins 69 to prevent the slitted portions 73 of the outer pins 69 from contracting the diameter thereof. In this way, the support bracket 13 is joined to the upper surface of the release bracket 12 with coupling members 68 so as to form a sub-assembly of the release bracket 12 and the support bracket 13.

In order to support and fix the assembly of the release bracket 12 and the support bracket 13 and the electricity-carrying plate 14 to the upper surface of the inner column 15, first, the front-side portion of the inner column 15 is fitted together with the rear-side portion of the outer column 16 so that relative displacement is possible, and a phase of the engagement hole 17 and the mounting hole 18 of the inner column 15 and the slit 19 of the outer column 16 with respect to the circumferential direction is matched (the engagement hole 17 and the mounting hole 18 are arranged inside the slit 19).

The release bracket 12 is elastically sandwiched and held from both sides in the width direction by the pair of plate spring portions 65 of the electricity-carrying plate 14, and elastically sandwiched and held from both sides the front-rear direction by the rear-side plate portion 64 and the pair of bent portions 66 of the electricity-carrying plate 14. In other words, the electricity-carrying plate 14 is temporarily fixed to the release bracket 12 so as to hold the release bracket 12 by the rear-side plate portion 64, the pair of plate spring portions 65 and the pair of bent portions 66.

Next, the engaging convex portion 51 of the release bracket 12 is engaged with the engagement hole 17 of the inner column 15 without looseness. Furthermore, the screw 57, which is a fixing member and is inserted through the first fixed-side through hole 48 of the release bracket 12 and the through hole 67 of the electricity-carrying plate 14, is screwed into the mounting hole 18 of the inner column 15, and further tightened. As a result, the assembly of the release bracket 12 and the support bracket 13, and the electricity-carrying plate 14 are arranged inside the slit 19 of the outer column 16, and are supported by and fixed to the upper surface of the inner column 15. Note that the assembly of the release bracket 12 and the support bracket 13, and the electricity-carrying plate 14 may be supported by and fixed to the upper surface of the inner column 15 by inserting a bolt though the first fixed-side through hole 48 of the release bracket 12, the through hole 67 of the electricity-carrying plate 14, and the mounting hole 18 of the inner column 15, and screwing the bolt into a nut.

In the steering column device 1 of this example, the telescopic friction plates 11 are supported by the pair of support arm portions 61 of the support bracket 13. Specifically, each support arm portion 61 is inserted through the support hole 46 of each of the pair of telescopic friction plates 11 of each of the friction plate units 44 without looseness in the front-rear direction and so as to be able to displace in the width direction.

A method for adjusting the position of the steering wheel 101 and then maintaining the adjusted position in a vehicle equipped with the steering column device 1 of this example will be described. First, when performing position adjustment of the steering wheel 101, by swinging the adjusting lever 9 in a specified direction (for example, downward), the drive-side cam 39 is rotated in the unlocking direction. In doing so, by arranging the convex portion of the drive-side cam surface and the convex portion of the driven-side cam surface alternately in the circumferential direction, the dimension in the axial direction of the cam device 10 is reduced and the distance between the driven-side cam 38 and the thrust bearing 41 increases. As a result, the contact pressure between the inside surfaces of the support plate portions 31*a*, 31*b* and the outside surfaces of the sandwiched portions 20*a*, 20*b* is reduced or lost, and at the same time, the inner-diameter dimension of the rear-side portion of the outer column 16 is elastically expanded, and the contact pressure between the inner-circumferential surface of the rear-side portion of the outer column 16 and the outer-circumferential surface of the front-side portion of the inner column 15 is reduced.

In such an unclamped state, the vertical position and the front-rear position of the steering wheel 101 can be adjusted. In this example, when the steering wheel 101 is moved to the front-end position within an adjustable range in the front-rear direction, the end surface on the front side of the support bracket 13 (the front-side surface of the reinforcement rib portion 62) comes in contact with the rear-side surface of the stopper member 27 that is attached to the outer column 16. On the other hand, when the steering wheel 101 is moved to the rear-end position within the adjustable range in the front-rear direction, the end surface on the rear side of the release bracket 12 comes in contact with the sleeve 43 that is externally fitted on the adjusting rod 8. In other words, the stopper member 27 functions as a stopper to define the front-end position of the adjustable range in the front-rear direction of the steering wheel 101, and the sleeve 43 functions as a stopper to define the rear-end position of the adjustable range in the front-rear direction of the steering wheel 101. On the other hand, it is possible to adjust the vertical position of the steering wheel 101 within the range in which the adjusting rod 8 is able to move inside the vehicle-body-side through holes 35 of the vehicle-body-side bracket 7.

By swinging the adjusting lever 9 in a direction opposite the specified direction (for example, upward) after the steering wheel 101 has been moved to a desired position, the drive-side cam 39 is rotated in the locking direction. Accordingly, by bringing the tip-end surface of the convex portion of the drive-side cam surface and the tip-end surface of the convex portion of the driven-side cam surface in contact with each other, the dimension in the axial direction of the cam device 10 is increased and the distance between the driven-side cam 38 and the thrust bearing 41 is reduced. As a result, the surface pressure at the contact parts between the inside surfaces of the support plate portions 31*a*, 31*b* and the outside surfaces of the sandwiched portions 20*a*, 20*b* increases, while at the same time, the inner-diameter dimension of the rear-side portion of the outer column 16 is elastically reduced, and the surface pressure at the contact part between the inner-circumferential surface of the rear-side portion of the outer column 16 and the outer-circumferential surface of the front-side portion of the inner column 15 is increased. As a result, the steering wheel 101 is maintained at the adjusted position.

The movement when a vehicle equipped with the steering column device 1 of this example has a collision accident will be described. When a vehicle has a collision accident, following a primary collision in which the vehicle body collides with another object, a secondary collision occurs in which the driver's body collides with the steering wheel 101. When such a secondary collision occurs, an impact load directed toward the front is applied from the steering wheel 101 to the inner column 15 via the upper shaft 3. When an impact load directed toward the front is applied to the inner column 15, the release bracket 12, together with the inner column 15, tries to displace toward the front with respect to the support bracket 13 supported to the vehicle body by the vehicle-body-side bracket 7 and the telescopic friction plates 11. As a result, a shearing force is generated between the release bracket 12 and the support bracket 13, and the coupling members 68 are sheared by the shearing force. Thereby, the inner column 15, and the upper shaft 3 and the steering wheel 101 that are supported by the inner column 15 are allowed to displace toward the front, so that the impact load that is applied to the driver's body is alleviated.

In this example, when the inner column 15 displaces toward the front, the outer-circumferential surface of the inner column 15 slides with respect to the inner-circumferential surface of the outer column 16 so as to absorb an impact load in the forward direction. Therefore, it is possible to adjust an absorbed amount of the impact load by adjusting the sliding resistance between the inner-circumferential surface of the inner column 15 and the outer-circumferential surface of the outer column 16. The height dimension of the release bracket 12 and the mounting position of the stopper member 27 are defined to allow the release bracket 12 to pass through under the stopper member 27 that is attached to the outer column 16 when the release bracket 12, together with the inner column 15, displaces toward the front.

In the steering column device 1 of this example, an impact absorbing mechanism to alleviate an impact load applied to a driver's body in the event of a secondary collision is configured by joining the release bracket 12, which is supported by and fixed to the upper surface of the inner column 15, and the support bracket 13 to each other with coupling members 68. Moreover, in the steering column device 1, a rotation prevention mechanism to prevent the relative rotation between the inner column 15 and the outer column 16 is configured by arranging the release bracket 12, which is supported by and fixed to the upper surface of the inner column 15, inside the slit 19 of the outer column 16. In short, in the steering column device 1 of this example, both the impact absorbing mechanism and the rotation prevention mechanism are located on the same side in the vertical direction of the steering column 6. Due to this, in the steering column device 1 of this example, it is not necessary to form a concave groove, with which the rotation prevention member that is supported by and fixed to the inner column engages, on the inner-circumferential surface of the outer column, in addition to the slit to expand or contract the inner diameter of the rear-side portion of the outer column, as described in JP2016-165935 (A). Therefore, the steering column device 1 of this example may easily secure the strength of the outer column 16, as well as enhance a processability of the outer column 16, compared with a structure as described in JP2016-165935 (A).

In this example, the plate spring portions 65 having an elasticity in the width direction are respectively arranged (sandwiched) between both outside surfaces in the width direction of the release bracket 12 and both inside surfaces in the width direction of the slit 19 of the outer column 16. Thereby, a looseness in the width direction of the release bracket 12 inside the slit 19 is prevented. In this example, the plate spring portions 65 that are arranged between both outside surfaces in the width direction of the release bracket 12 and both inside surfaces in the width direction of the slit 19 of the outer column 16 are configured as a portion of the electricity-carrying plate 14 that is configured to establish an electrically conductive connection between the inner column 15 and the outer column 16. It is thus not necessary to provide any member that is exclusively used for preventing the looseness in the width direction of the release bracket 12 inside the slit 19, which contributes to cost suppression.

In this example, a height $H_1$ of a contact part between the upper surface of the release bracket 12 and the lower surface of the support bracket 13 in the radial direction of the steering column 6 (shear position of the coupling member 68 in the radial direction of the steering column 6) from the center axis $O_6$ of the steering column 6 is approximately the same as a height $H_2$ of the center axis $O_8$ of the adjusting rod 8 in the radial direction of the steering column 6 from the center axis $O_6$ of the steering column 6. Most preferably, the height $H_1$ is the same as the height $H_2$ ($H_1=H_2$) in the radial direction. Due to this, the release bracket 12 and the inner column 15 can be stably released toward the front. This reason will be described below.

As an impact load directed toward the front is applied to the inner column 15 in the event of a secondary collision, a force directed toward the front is applied to the front-side portions of the telescopic friction plates 11 via the release bracket 12 and the support bracket 13. Therefore, when a difference between the height $H_1$ and the height $H_2$ is large in the radial direction, a moment around the center axis $O_8$ is generated in the telescopic friction plates 11 by a force that is applied to the telescopic friction plates 11. The generation of such a moment may possibly make the telescopic friction plates 11 easy to slide with respect to the outside surfaces of the sandwiched portions 20a, 20b and the support plate portions 31a, 31b, and thus is not preferable in point of effective use of the impact load that is applied to the inner column 15 at the moment when a secondary collision occurs as a force for shearing the coupling members 68.

On the other hand, in this example, because the height $H_1$ is approximately the same as the height $H_2$ in the radial direction, it is possible to prevent a moment around the center axis $O_8$ of the adjusting rod 8 from generating in the telescopic friction plates 11. Therefore, it is possible to prevent the telescopic friction plates 11 from sliding with respect to the outside surface of the sandwiched portions 20a, 20b and the support plate portions 31a, 31b, and thus to effectively use the impact load that is applied to the inner column 15 at the moment when a secondary collision occurs as a force for shearing the coupling members 68. As a result, the release bracket 12 and the inner column 15 can be stably released toward the front in the event of a secondary collision.

In this example, when the steering wheel 101 is moved to the rear-end position within an adjustable range in the front-rear direction, the end surface on the rear side of the release bracket 12 that is supported by and fixed to the inner column 15 is to be in contact with the sleeve 43 that is externally fitted on the adjusting rod 8. Due to this, even when the steering wheel 101 is moved to the rear-end position with great force, it is possible to prevent a sheering force from generating between the release bracket 12 and the support bracket 13, and thus prevent the coupling members 68, which join the release bracket 12 and the support bracket 13 to each other, from shearing.

In this example, the slit 19 is formed on the upper surface of the outer column 16, and the release bracket 12 is supported by and fixed to the upper surface of the inner column 15. However, the steering column device of another example of an embodiment of the present invention may be configured so that the slit is formed in the lower surface of the outer column, and the release bracket is supported by and fixed to the lower surface of the inner column.

The steering device of the present invention may include an impact absorbing member that is configured to be plastically deformed due to an impact load during a secondary collision so as to absorb the impact load. Specifically, for example, the impact absorbing member may be arranged so as to span between the release bracket or the inner column, and the support bracket or the outer column. The impact absorbing member may be formed, for example, by bending and molding a wire or a belt-shaped plate made of a metal as mild steel or the like.

REFERENCE SIGNS LIST

1 Steering column device
2 Steering shaft
3 Upper shaft
4 Lower shaft
5 Key lock collar
6 Steering column
7 Vehicle-body-side bracket
8 Adjusting rod
9 Adjusting lever
10 Cam device
11 Telescopic friction plate
12 Release bracket
13 Support bracket
14 Electricity-carrying plate
15 Inner column
16 Outer column
17 Engagement hole
18 Mounting hole
19 Slit
20a, 20b Sandwiched portion
22 Main slit portion
23 Auxiliary slit portion
24 Rocking support bracket portion
25 Rocking support hole
26 Protruding piece portion
27 Stopper member
28 Concave portion
29 Locking through hole
30a, 30b Rolling bearing
31a, 31b Support plate portion
32a, 32b Front-side plate portion
33a, 33b Top plate portion
34 Connecting plate portion
35 Vehicle-body-side through hole
36 Bracket-side mounting hole
37 Head portion
38 Driven-side cam
39 Drive-side cam
40 Nut
41 Thrust bearing
42 Fixed-side friction plate
43 Sleeve
44 Friction plate unit
45 Telescopic elongated hole
46 Support hole
47 Mounting plate portion
48 First fixed-side through hole
49 Second fixed-side through hole
50 Third fixed-side through hole
51 Engaging convex portion
53 Side plate portion
54 End plate portion
55 Top plate portion
56 Recessed hole
56 Bottom plate portion
57 Screw
58 First releasing-side through hole
59 Second releasing-side through hole
60 Mounting portion
61 Support arm portion
62 Reinforcement rib portion
63 Base plate portion
64 Rear-side plate portion
65 Plate spring portion
66 Bent portion
67 Through hole
68 Coupling member
69 Outer pin
70 Inner pin
71 Cylindrical portion
72 Outward-facing flange portion
73 Slitted portion
74 Shaft portion
75 Head portion
76 Side plate portion
101 Steering wheel
102 Steering shaft
103 Universal joint
104 Intermediate shaft
105 Steering gear unit
106 Tie rod
107 Steered wheel
108, 108a Steering column device
109 Steering column
110 Outer column
111 Inner column
112 Slit
113 Sandwiched portion
114 Engaged member
115 Adjusting rod
116 Cam member
117 Adjusting lever
118 Cam device
119 Vehicle-body-side bracket
120 Support plate portion
121 Engaging member
122 Supporting axis
123 Engaging convex portion
124 Concave groove
125 Rotation prevention member

The invention claimed is:
1. A steering column device comprising:
an inner column;
an outer column having a rear-side portion into which a front-side portion of the inner column is internally fitted, a slit extending in an axial direction thereof, a pair of sandwiched portions arranged at positions sandwiching the slit from both sides in a width direction thereof, and a pair of column-side through holes penetrating each of the pair of sandwiched portions in the width direction;

a vehicle-body-side bracket having a pair of support plate portions sandwiching the pair of sandwiched portions, and a pair of vehicle-body-side through holes provided in portions of the pair of support plate portions that are aligned with each other;

an adjusting rod inserted through the pair of column-side through holes and the pair of vehicle-body-side through holes;

a pair of pressing portions arranged on portions of the adjusting rod that protrude from outside surfaces of the pair of support plate portions;

an expansion/contraction device configured to expand or contract a distance between the pair of pressing portions;

a telescopic friction plate sandwiched in at least any of a portion between an inside surface of the pair of support plate portions and an outside surface of the pair of sandwiched portions, and a portion between an outside surface of the pair of support plate portions and an inside surface of the pair of pressing portions, and having a telescopic elongated hole through which the adjusting rod is inserted;

a release bracket arranged inside the slit, and supported by and fixed to the inner column; and a support bracket having a mounting portion that is joined to the release bracket so as to be able to detach due to an impact load that is applied to the inner column during a secondary collision, and a support arm portion that supports the telescopic friction plate.

2. The steering column device according to claim 1, comprising a plate spring portion that is sandwiched in at least any of portions between inside surfaces on both sides in the width direction of the slit and outside surfaces on both sides in the width direction of the release bracket, and is able to be elastically deformed in the width direction.

3. The steering column device according to claim 2, wherein the plate spring portion is a portion of an electricity-carrying plate that is configured to establish an electrically conductive connection between the inner column and the outer column.

4. The steering column device according to claim 1, wherein a contact part between the release bracket and the support bracket and a center axis of the adjusting rod have approximately the same height from a center axis of the inner column in a radial direction of the inner column.

5. The steering column device according to claim 1, wherein the inner column has an engagement hole, and a mounting hole that is arranged separate from the engagement hole in a front-rear direction thereof, the release bracket has a first fixed-side through hole, a second fixed-side through hole that is arranged separate from the first fixed-side through hole in the front-rear direction, a third fixed-side through hole that is arranged opposite to the first fixed-side through hole across the second fixed-side through hole, and an engaging convex portion that protrudes inward in the radial direction of the inner column so as to have a cylindrical shape surrounding the second fixed-side through hole, the mounting portion of the support bracket has a first releasing-side through hole, and a second releasing-side through hole that is arranged separate from the first releasing-side through hole in the front-rear direction, the engaging convex portion is engaged with the engagement hole, and a fixing member is inserted through or screwed into the first fixed-side through hole and the mounting hole, so that the release bracket is supported by and fixed to the inner column, and coupling members are respectively inserted through both inner sides of the second fixed-side through hole and the first releasing-side through hole, and through both inner sides of the third fixed-side through hole and the second releasing-side through hole, so as to be able to be sheared due to an impact load that is applied to the inner column during a secondary collision, so that the support bracket is detachably joined to the release bracket.

* * * * *